Oct. 23, 1956
D. F. MELTON
2,767,940
BALLOON WITH STRENGTHENING ELEMENTS
Filed Nov. 4, 1953
2 Sheets-Sheet 1
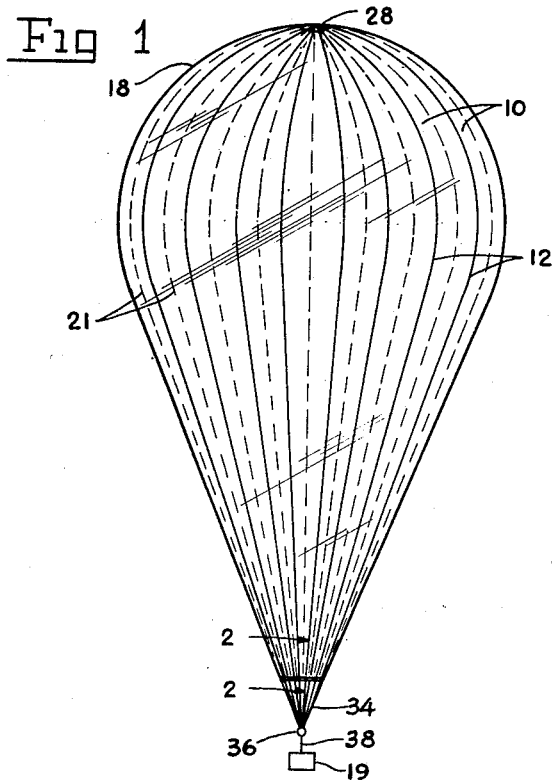
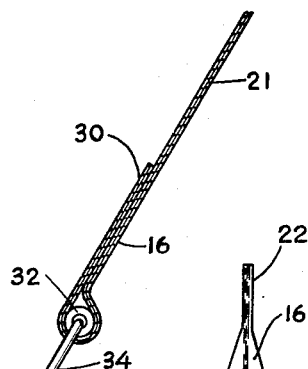
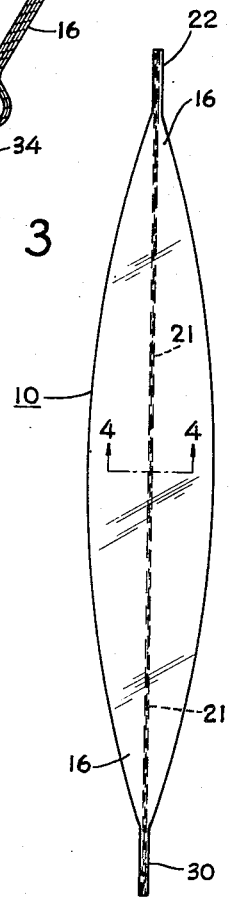
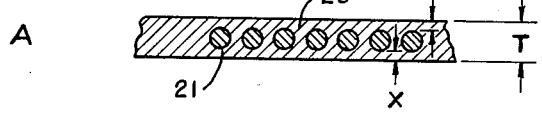
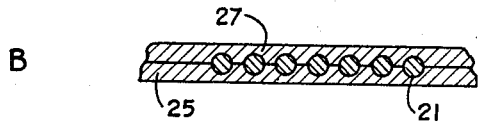
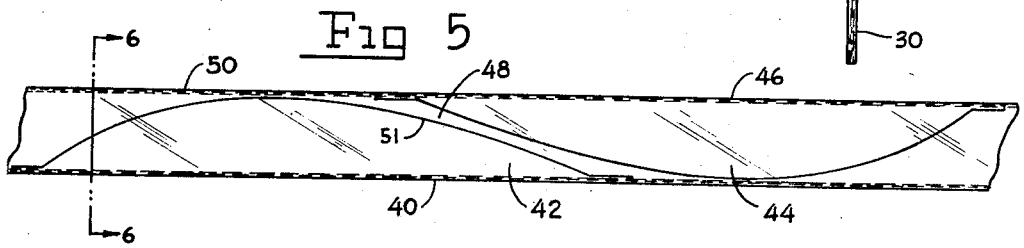
DONALD F. MELTON INVENTOR
BY William C. Strueber ATTORNEY Oct. 23, 1956  D. F. MELTON  2,767,940
BALLOON WITH STRENGTHENING ELEMENTS
Filed Nov. 4, 1953  2 Sheets-Sheet 2
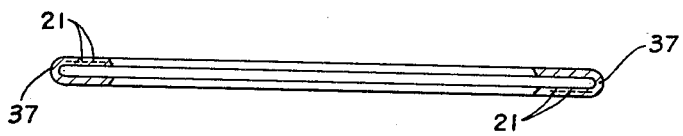
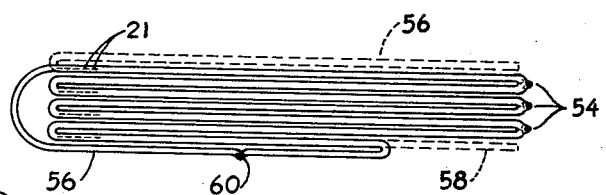
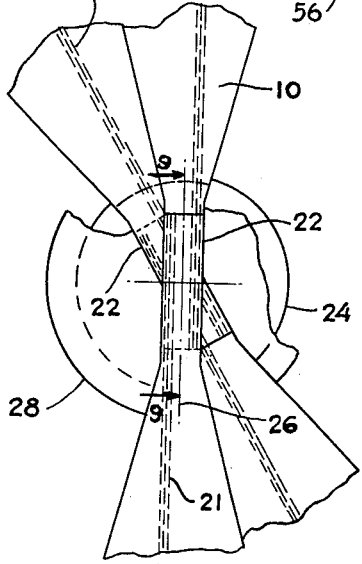
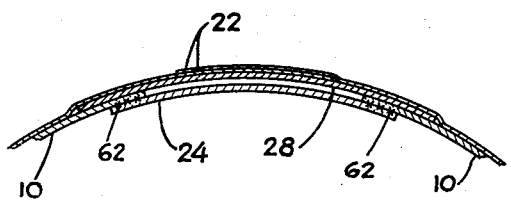
DONALD F. MELTON INVENTOR
By William C. Stueber ATTORNEY

United States Patent Office 2,767,940
Patented Oct. 23, 1956

2,767,940

BALLOON WITH STRENGTHENING ELEMENTS

Donald F. Melton, Minneapolis, Minn., assignor to General Mills, Inc., a corporation of Delaware Application November 4, 1953, Serial No. 390,163

8 Claims. (Cl. 244—31)

This invention relates to improvements in balloons and more specifically to means for enhancing the strength of a load-carrying balloon.

Balloons which are designed for carrying substantial loads and for ascending to high altitudes are, of necessity, large in size and if high altitudes are to be reached they must be designed so that the ballon envelope is as light in weight as possible. Also to effect savings in material and obtain a maximum rate of rise the balloons are designed to have a streamlined shape.

One design which accomplishes these objectives is a balloon which is formed of a plurality of gores which are attached to each other at their edges to form a balloon envelope. The gores are elongated in shape in being broad at the center and tapering to narrow ends. By proper design of the gores a streamlined balloon may be readily achieved. These balloons generally have a gas release valve at the bottom so that when the internal pressure rises above atmospheric, the gas will be pushed out through the valve at the bottom but atmospheric air cannot enter the balloon. With this type of balloon and with proper shape the horizontal stresses can be reduced to a very low quantity. The dangerous stresses which are encountered are vertical.

Since the load is carried at the lower end of the balloon, some means must be provided to attach it to the balloon envelope so that it may be supported by the lift of the gases within the balloon. The problem is to transmit the weight of the load equally over the top surface of the balloon envelope so that no points of concentrated stress will be present.

One method of obtaining strength in a balloon envelope and of transmitting the weight of the load over the surface of the balloon is to place load bearing tapes over the balloon envelope in the form of a harness and attach these tapes to the load at the bottom of the balloon. Although this method has considerable advantages the tapes add additional unwanted weight to the balloon thereby reducing its load carrying capacity. Further, the tapes are difficult to attach to a large unwieldy balloon after or during its manufacture and the tapes must be secured to the balloon in some manner as by adhesives. The adhesives are often unsuitable in that when the balloon ascends to high altitudes which are regions of severe cold, the adhesives lose their strength and the tapes may become loosened with a consequent failure of flight. The tapes have been known to cut into the balloon with their sharp edges and cause leaks to occur, especially when a very light weight thin balloon material is used.

An objective of the present invention is to provide a balloon made of material which will obviate the necessity of attaching load supporting tapes to the balloon gores and which will obtain a balloon with adequate strength along its vertical axis so that the weight of the load is transferred to the top of the balloon and is distributed over its top surface.

Another object is to provide a material which has equal or superior strength and weighs considerably less than taped balloon material.

Another objective is to provide a balloon material which will lend appreciable strength to the balloon envelope, which is economical to produce and which may be formed into balloon gores with a minimum of waste.

Another object of the invention is to provide a balloon material which will save time in the fabrication of a balloon envelope.

Other objects and advantages will become more apparent in the following specification and appended drawings in which:

Figure 1 is an elevational view of the balloon in flight;

Fig. 2 is a detailed sectional view along lines 2—2 of Fig. 1 illustrating the manner of attaching the load to the balloon envelope;

Fig. 3 is a plan view of a balloon gore having the load supporting strengthening filaments extending longitudinally through the center;

Figs. 4A and 4B are greatly enlarged sectional views showing different sections taken along lines 4—4 of Fig. 3 to illustrate one type of strengthening filaments with Figs. 4A and 4B illustrating different ways of embedding the filaments in the material;

Fig. 5 is a plan view illustrating the manner of laying out and cutting the balloon gores from tubular material;

Fig. 6 is a sectional view taken along lines 6—6 of Fig. 5 and illustrating the position of the strengthening filaments when a tubular material is used;

Fig. 7 is a sectional view taken through the uninflated balloon after fabrication, the section being taken perpendicular to the gore axis to illustrate the relative position of the strengthening filaments and the attached gores;

Fig. 8 is a plan view of a portion of the top of the balloon illustrating the manner of securing the gores at the balloon top; and, Fig. 9 is a sectional view taken along line 9—9 of Fig. 8.

In the balloon illustrating the preferred embodiment of the present invention, a gas containing balloon envelope is formed of a plurality of gores 10, Fig. 1. These gores are joined together at their edges to form seams 12. The gores, as illustrated in Fig. 3, are elongated strips of flattened light weight material such as plastic and have a wide portion at the center which tapers to narrower portions at the ends 16.

When a series of gores of substantially this shape are joined together, the resulting balloon envelope is streamlined in shape having a spherical top 18 and a conical bottom 20. By alteration of the gore shape the shape of the balloon envelope can be changed at will to obtain the optimum design for a fast rate of rise and low horizontal stresses.

It will be noted from Fig. 1 that as a basic principle the load 19, which is carried at the base or bottom end of the balloon, exerts a downward pull which is counteracted by the lifting effect of the gas within the balloon. Between these two forces the balloon material must carry the weight. The problem, therefore, is to distribute the weight evenly over the surface of the balloon and transmit the forces due to the weight of the load to the top of the balloon, distributing these forces as evenly over the top as possible to create an even stress in the material. As previously stated herein, this has heretofore been done with the use of load supporting tapes placed over the seams. These tapes were hard to handle and frequently became loose from the balloon and cut the balloon with their sharp edges.

The present invention utilizes light weight filaments or threads which are embedded in the balloon material to transmit and distribute the force of the load over the balloon surface. These filaments 21 are shown arranged to run parallel to the axis of the balloon gore since the stress due to the weight of the pay-load is totally vertical. Therefore, a pull in the vertical direction on any one of the filaments which extends within the balloon material will be transmitted along the filament. If the load is connected at the lower end of the group of filaments, its weight will be carried along the filaments to the top of the balloon.

The filaments 21, in greatly enlarged detail in Fig. 4, are embedded directly in the material and may constitute strands such as cotton or nylon woven together to form a thread or cord. These threads may be grouped or placed side by side in the number which is necessary to carry the total load.

It will be noted that these threads are embedded directly in the material 23 as is shown in Fig. 4A and, if the material is a plastic, they may be placed in the material when it is first formed. In plastic manufacturing processes this may readily be accomplished. Other means of embedding the filaments may be by laminating them between two layers 25 and 27 of material as is shown in Fig. 4B.

Practically no additional weight has been added which avoids one of the large disadvantages with the use of tapes, i. e., the extra carrier material for the filaments has been completely eliminated and the balloon material acts as a carrier. The addition of the filaments does not necessarily weaken the strength of the plastic. Although the total thickness, i. e., $X+Y$ is less than T, the strength in the vertical direction has been enhanced by the embedded cords 21 and the stress in the horizontal direction is small in relation to the vertical stress. If desired, the plastic material could be thickened at the cords so that thickness $X+Y$ would equal thickness T and no reduction of horizontal stress will have resulted from adding the cords.

Where the gores meet at the top of the balloon they extend past the top center to overlap. The portion which overlaps is a narrow strip 22 of gore material which contains the strengthening filaments. This narrow extension strip, Figs. 3 and 8, is laid over a round flat floating disc 28 of material which forms part of the balloon cap. As each extension strip 22 is laid against the disc 28 it overlaps the other extensions in the manner shown by the strips of Figs. 8 and 9 and they may be cemented or heat sealed to each other and to the disc. The disc 28 is not attached to the disc 24, which is positioned beneath it and which is heat sealed at 62 to the ends of the gores 10 to form a gas seal. The detail of this arrangement is shown in Fig. 8 with some of the gores omitted for purposes of clarity.

It is to be noted in both Figs. 8 and 9 that the extension strip 22 is slightly off center from the central axis 26 of the gore. This is due to the method of making the gores as will later be described in connection with Figs. 5, 6 and 7. In reality the distance the elements are off center is very small so that compared with the overall gore they are in the center for all practical purposes as is shown by the gore of Fig. 3.

The lower end of the gore has an extension strip 30 similar to that at the top and the strip also contains the strengthening elements 21. At the lower end of the balloon this strip 30 is doubled back on itself around a supporting thimble 32 as is shown in detail in Fig. 2. The strip, after being doubled around the thimble, may be cemented or heat sealed to the gore 16. A line 34 is then passed through the eye of the thimble and extends downwardly to connect to the load ring 36 as is shown in Fig. 1. A line 38 from the load 19 is then secured to the load ring to support the load from the balloon. From the foregoing, it will be seen that the weight of the load is transmitted to the line 38, the load ring 36 and load lines 34, and directly to the filaments which are embedded in the gore. The weight of the load is then transmitted through the filaments to the top of the balloon, each filament carrying a share of the load and distributing this to its gore and each group of filaments in the gores carrying their share and equally distributing the force of the load over the balloon envelope.

The preferred method of cutting the gores and assembling them to form a balloon envelope is shown in Figs. 5–7. The original material, as shown in Fig. 6, is preferably tubular in form. Many thermoplastics are made by extrusion and by this method tubular material is inexpensive to make and easy to handle. The plastic tubular material has the filaments 21 embedded therein during manufacture and has two groups of filaments diametrically opposite each other.

For shipping, the thermoplastic is flattened in the manner shown in Fig. 6 and rolled on a roll. The filaments are preferably positioned so that their locations are adjacent the folded edges 37 of the material, because the material would not fold easily if the filaments were located exactly at the folded edge.

To lay out the gores, the tubular material is stretched out flat on a surface such as a table in the manner shown in Fig. 5. The gores are then patterned alternately with the center axis 40 of the gore 42 being along one edge of the doubled material and the gore 44 reversed so that its axis 46 is at the other edge of the material. In this manner the gores can be brought close together and the waste area 48 is kept to a minimum. The strengthening filaments 50 which run along the underside of the right side 46 of the material extend along the axis 46 of the gore 44. The gore 42 is cut so its outer edges 51 are just short of the filaments so that they are not included within the gore. This narrow strip which falls in the waste area 48 is very small and the amount of waste incurred is insignificant compared to the amount of waste which would be necessary if the gores were all laid end to end in the same direction. It will be seen from the drawings that the circumferential length of the tubular material should be slightly larger than the width of a gore. In other words the width of the flattened tubular material should be such that the width of the half gore pattern may be laid on the material with its axis corresponding to one edge of the material and the edge of the pattern not covering the embedded filaments at the other edge of the material.

Thus it will be seen that the filaments are in two groups diametrically opposite each other in the tubular material and the gores will be cut so they take advantage of the strengthening filaments at alternate sides of the material. Actually the filaments will be slightly off center as is indicated by the center axis line 26 in Fig. 8, but the offset is so small the strength of the material is not affected.

In manufacturing the balloon from a series of gores, the gores are doubled and stacked on top of each other in the manner shown in Fig. 7. Their raw cut edges are shown on the right side of the stack as being joined by seams 54. The topmost layer 56, shown in the dotted line position of Fig. 7, is swung around to the solid line position and joined with the edge of the lowermost layer 58 which is folded from the dotted to the solid line position and joined to the top layer by the seam 60. This forms the complete closed balloon envelope with all of the gores joined at their adjacent edges.

It is to be noted that the gores stack evenly and smoothly aided by the embedded filaments which are positioned to one side of the central axis of the gore. As was above stated, although the filaments then do not extend directly down the center of the gore of the balloon, the small deviation which places them just at one side of the central axis of the gore makes no substantial difference in their strength imparting qualities.

Another important advantage in embedding the strengthening elements in the balloon material over using a commercial type adhesive backed tape is in the reduced amount of heat absorbed during flight. During flight the gas within the balloon acquires heat from solar radiation. This causes the gas to expand and when the balloon is completely inflated the expanding gas will be exhausted from the balloon through the valve at the bottom and lost. At night the gas cools and contracts and the balloon descends. If the amount of heat remaining taken on by the gas during the day can be reduced the gas will not contract as much at night and the balloon will assume a much more level flight. It is apparent that it is highly desirable to reduce the amount of solar heat taken on by the gas so that the heated gas will not be lost and the balloon will assume a more level flight.

Thin plastic material such as polyethylene is advantageous because it is nearly transparent and will not absorb much heat from the rays of the sun. Commercial adhesive backed tape, however, is translucent and is practically opaque as far as the rays of the sun are concerned and during flight absorbs considerable heat. This heat is transmitted by the tapes to the gas within the balloon and the undesirable solar radiation effects result. By embedding the strengthening filaments in the transparent balloon material heat absorbing tapes are not necessary and the amount of heat absorbed by the embedded filaments in relation to the heat absorbed by tape is drastically reduced. It is estimated that embedded filaments acquire 90% less heat by solar radiation than do tapes.

Thus it will be seen that in addition to providing an improved balloon which reduces the undesirable effects of solar radiation, I have provided a material for making a balloon which is very economical and also very easy to handle. The balloon structure is superior in strength and obtains a very smooth finished article. The disadvantage inherent in strengthening a balloon by adding load bearing tapes which include the addition of useless weight is avoided without sacrificing any of the advantages of the strength imparting members. The saving in weight is accompanied by an appreciable saving in the time normally required to fabricate the balloon when tapes are added by the methods heretofore used.

I have, in the drawings and specification, presented a detailed disclosure of the preferred embodiment of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

I claim as my invention:

1. A balloon for carrying a load to high altitudes comprising a balloon envelope of a light weight material impervious to gas for containing a quantity of lifting gas, means for supporting a load at the lower end of the balloon and a plurality of strengthening elements embedded in the balloon material and extending longitudinally from the lower end to the upper end of the balloon and being attached to said load supporting means to transmit the weight of the load to the balloon material.

2. A balloon for carrying a load to high altitudes comprising a plurality of elongated gores being attached to each other at their side edges to form a complete balloon envelope for containing a lifting gas, a plurality of strengthening elements extending parallel to the gores and embedded in each of the gores to extend from the bottom to the top of the balloon, means for attaching a load to the bottom of the balloon being attached to the strengthening elements so that the weight of the load is transmitted to the balloon gores and will be equally supported over the balloon surface.

3. A balloon for carrying a load to high altitudes comprising a series of elongated gores of balloon material being attached at their adjoining edges to form a gas containing balloon envelope, strengthening elements extending longitudinally down the center of each of the gores and embedded in the balloon material, means to support a load at the base of the balloon being attached to the balloon material enclosing the strengthening elements so that the weight of the load is transmitted to the strengthening element and is distributed over the surface of the balloon.

4. A balloon for carrying a load to high altitudes comprising a balloon envelope formed of a series of light weight thermoplastic gores heat sealed at their adjoining edges to form a streamlined balloon envelope, strengthening filaments embedded in the center of the balloon gores and extending from the bottom to the top of the balloon, a support for carrying the load at the base of the balloon, and means for attaching the support to the strengthening filaments so that the weight of the load will be transmitted over the surface of the balloon by the filaments.

5. A balloon gore which is to be incorporated in a balloon having a plurality of elongated gores attached at their adjoining edges, the gore comprising an elongated thin light weight strip of material tapering from a wide center section to narrower ends and having strengthening strands embedded in the center of the gore and extending the length of the gore for imparting longitudinal strength to the gore.

6. A balloon material for forming a gored balloon comprising a tubular shaped light weight material having a circumferential length at least the width of a gore and strengthening filaments embedded in the material and running parallel to the axis of the tubular material, the tubular material being seamless and the filaments arranged in two groups with the groups positioned diametrically opposite each other.

7. A balloon gore for forming a multi-gored balloon envelope, the gore comprising an elongated section of light weight sheet material cut into a gore wider at the center and tapering to narrower portions at the ends, and strengthening filaments embedded in the material and extending in a group at one side of the central axis of the gore.

8. A gore for forming a multi-gored load carrying balloon comprising an elongated sheet of thin balloon material cut with a wide portion at the center with the ends tapered to narrow portions to form a substantially elliptically shaped gore, strengthening elements embedded in the gore and extending in a group substantially down the center of the gore parallel to the longitudinal axis thereof, and extensions of the material at the ends of the gore containing the filaments which are adapted to be overlapped at the top of the balloon and to be secured to a load supporting means at the lower end of the balloon to distribute the load over the balloon surface through the strengthening filaments.

References Cited in the file of this patent
UNITED STATES PATENTS

| | | |
|---|---|---|
| 1,358,283 | Brown | Nov. 9, 1920 |
| 2,384,462 | Goodman | Sept. 11, 1945 |
| 2,525,121 | Fletcher | Oct. 10, 1950 |
| 2,526,719 | Winzen | Oct. 24, 1950 |
| 2,593,090 | Bartosz | Apr. 15, 1952 |
| 2,602,609 | Huch | July 8, 1952 |